3,379,688
PROCESS FOR THE MANUFACTURE OF WATER-INSOLUBLE POLYSULFONIC ACIDS ON THE BASIS OF ACROLEIN POLYMERS AND CO-POLYMERS

Robert Büning, Oberlar, Germany, assignor to Dynamit Nobel Aktiengesellschaft, Troisdorf, Bezirk Cologne, Germany, a corporation of Germany
No Drawing. Filed Apr. 7, 1965, Ser. No. 450,234
10 Claims. (Cl. 260—67)

ABSTRACT OF THE DISCLOSURE

There is disclosed a novel class of water-insoluble polysulfonic acids on the basis of acrolein polymers and copolymers. The aforesaid polysulfonic acid products are characterized by large interior surfaces and are suitable for use, for example, as acid catalysts, ion exchange materials, etc.

The water-insoluble polysulfonic acid products are prepared by reacting polyacrolein with hydrogen sulfide in a strongly acid aqueous medium and thereafter oxidizing the thusly produced sulfur-containing polymers in an aqueous medium at a temperature of between about 20–100° C.

---

This invention relates to a process for the manufacture of water-insoluble polysulfonic acids on the basis of acrolein polymers and copolymers. The invention also relates to the water-insoluble polysulfonic acids thereby produced.

In accordance with the invention, it has now been found that water-insoluble polysulfonic acids on the basis of acrolein polymers and copolymers can be obtained by reacting an acrolein polymer or copolymer with hydrogen sulfide in a strongly acid aqueous medium and thereafter subjecting the sulfur-containing polymers thus produced to an oxidation reaction, the oxidation reaction being conducted by contacting the sulfur-containing polymer with an oxidant in an aqueous medium at a temperature of between about 20–100° C.

As oxidant there may be employed any of the conventional oxidizing agents such as hydrogen peroxide, nitric acid, oxygen, peracids, for instance, peracetic acid, and the like.

That water-insoluble products are produced in accordance with the invention is most surprising in view of the high content of sulfonic acid groups in these products.

In carrying the present invention into effect, polymers of acrolein and their copolymers with other monomers such as styrene, acrylic acid esters, methacrylic acid esters, vinylchloride, vinylidene chloride, vinylacetates, vinylpropionate, vinylstearate, vinylether, itaconic acid, itaconic acid esters, vinylpyrrolidone, vinylcarbazol, ethylene, propylene, divinylbenzene may be employed.

The starting acrolein polymers or copolymers as employed in the invention have a relative viscosity within the range of from 1.2 and 7.0.

The sulfur-containing polymer is produced by contacting the aforesaid polymer or copolymer with $H_2S$ in a strongly aqueous medium. Preferably a hydrochloric acid solution is utilized for the reaction medium but an aqueous medium made acid with sulfuric acid as well as any other strong acid may be advantageously employed.

The treatment of the polymer with $H_2S$ is effected with a pH of the reaction medium at a value of less than 4.

The present process, therefore, makes it very easy to produce aliphatic polysulfonic acids which are insoluble in water. The strongly acid products which are produced according to the invention are characterized by large interior surfaces and therefore can be used advantageously as acid catalysts even at relatively high temperatures. Furthermore, the products cleave neutral salt such as sodium chloride, so that they can also be used advantageously as ion exchange materials. As the starting materials, namely, acrolein polymers and copolymers can be varied in many ways, the polymers can be adapted to various applications.

Other reactions such as addition and condensation reactions, or the like, can be conducted prior to the oxidation on the reaction products of the acrolein polymers and copolymers with hydrogen sulfide such as, for instance, a reaction with formaldehyde or other aldehyde, such as acetaldehyde, propionaldehyde, butyraldehyde, and the like. The products thus produced absorb more water which is advantageous in connection with certain applications.

The following examples are given for the purpose of illustrating the invention and are not to be construed as a limitation thereof.

EXAMPLE 1

100 g. polyacrolein (relative viscosity 1.2) dissolved in $H_2SO_3$ (10%) were suspended using agitation in 1,000 cc. concentrated hydrochloric acid. Hydrogen sulfide was then introduced into this suspension. After 8 hours a product was obtained having a sulfur content of 31.5%. This latter product was suction filtered and washed and, without drying, 700 cc. of 15% hydrogen peroxide were added thereto. The reaction temperatrue was maintained between 30° and 60° C. by cooling. However, the use of higher and lower temperatures was possible. After 2 hours, the reaction had begun to slow down and after about 5 hours it had been completed. The yield amounted to 145 g. The polysulfonic acid product produced had a sulfur content of 16.5%.

Analogous products, but having higher or lower sulfur contents, were prepared by changing the reaction time and the pressure in the reaction with hydrogen sulfide.

EXAMPLE 2

The process of Example 1 was repeated but, in place of the 15% hydrogen peroxide, 700 cc. of 13% peracetic acid were employed. The polysulfonic acid product obtained corresponded to that recovered in Example 1.

EXAMPLE 3

1,000 g. polyacrolein (relative viscosity 3.5) were reacted with $H_2S$, as described in Example 1, to produce a product having a sulfur content of 25.3%. 50 g. of this product were suspended at 75° C. in 250 cc. 40% formalin and 5 g. NaOH in 30 cc. $H_2O$ were then added drop-by-drop within a period of 1 hour. The product thereby produced had a sulfur content of 20.5%. This product was oxidized with hydrogen peroxide by the procedure described in Example 1. The end product thus obtained absorbed about twice the amount of water as did the product of Example 1, without passing into a gel-like state.

EXAMPLE 4

A process analogous to that of Example 3 was employed but, in place of the 250 ml. of 40% formalin, there were employed 130 g. acetaldehyde, together with 160 ml. water. The water absorption of the polysulfonic acid product thus produced was 1.55 times greater than that of Example 1.

EXAMPLE 5

100 g. of a copolymer of acrolein and vinyl ethyl ether having a content of 15% vinyl ethyl ether (relative viscosity 1.8) were suspended using agitation in 100 cc. concentrated hydrochloric acid. Thereafter, hydrogen sulfide was introduced into the suspension. After 6 hours of reaction time at 20° C. the product was suction filtered and washed, and then oxidized as described in Example 1. The yield of polysulfonic acid product amounted to 125 g. and had a sulfur content of 10.5%.

I claim:

1. Process for the preparation of water-insoluble polysulfonic acids on the basis of a member selected from the group consisting of polymers of acrolein and copolymers of acrolein with another ethylenically unsaturated monomer copolymerizable therewith, which comprises reacting polyacrolein with hydrogen sulfide in a strongly acid aqueous medium, thereafter subjecting the sulfur-containing product thus obtained to an oxidation reaction in an aqueous medium at a temperature between about 20 and 100° C., and recovering the water-insoluble polysulfonic acid product thereby formed.

2. Process according to claim 1, wherein said oxidation reaction is effected with a member selected from the group consisting of hydrogen peroxide, nitric acid, oxygen, and peracids as oxidant.

3. Process according to claim 1, wherein said oxidation reaction is effected with hydrogen peroxide as oxidant.

4. Process according to claim 1, wherein said oxidation is effected with peracetic acid as oxidant.

5. Process according to claim 1, wherein said oxidation is effected at a temperature of 30 to 60° C.

6. Process for the preparation of water-insoluble polysulfonic acids on the basis of a member selected from the group consisting of polymers of acrolein and copolymers of acrolein with another ethylenically unsaturated monomer copolymerizable therewith, which comprises reacting polyacrolein with hydrogen sulfide in a strongly acid medium, subjecting the sulfur-containing product thus obtained to a condensation reaction with a saturated lower aliphatic aldehyde, thereafter subjecting the latter condensation product to an oxidation reaction in an aqueous medium at a temperature between about 20° C. and 100° C., and recovering the water-insoluble polysulfonic acid product thereby formed.

7. Process according to claim 6, wherein said condensation reaction is effected with formaldehyde in an alkaline medium.

8. Process according to claim 6 wherein said reaction with $H_2S$ is effected in a medium having a pH of less than 4.

9. A water-insoluble aliphatic polysulfonic acid produced by the process of claim 1.

10. A water-insoluble aliphatic polysulfonic acid produced by the process of claim 6.

References Cited

UNITED STATES PATENTS

| | | | |
|---|---|---|---|
| 3,127,374 | 5/1964 | Kern et al. | 260—67 |
| 3,248,335 | 4/1966 | Welch et al. | 260—67 |

WILLIAM H. SHORT, *Primary Examiner.*

L. M. PHYNES, *Assistant Examiner.*